(12) United States Patent
Nicolosi et al.

(10) Patent No.: US 12,368,379 B2
(45) Date of Patent: Jul. 22, 2025

(54) CONTROL MODULE FOR A RESONANT SWITCHED-CAPACITOR CONVERTER AND METHOD FOR CONTROLLING A RESONANT SWITCHED-CAPACITOR CONVERTER

(71) Applicant: STMicroelectronics S.r.l., Agrate Brianza (IT)

(72) Inventors: Alessandro Nicolosi, Dresano (IT); Alessandra Farina, Novara (IT); Edoardo Bonizzoni, Pavia (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 259 days.

(21) Appl. No.: 18/295,538

(22) Filed: Apr. 4, 2023

(65) Prior Publication Data
US 2023/0327555 A1    Oct. 12, 2023

(30) Foreign Application Priority Data
Apr. 12, 2022 (IT) .................. 102022000007265

(51) Int. Cl.
*H02M 3/158* (2006.01)
*H02M 1/00* (2006.01)
*H02M 3/07* (2006.01)

(52) U.S. Cl.
CPC ......... *H02M 3/158* (2013.01); *H02M 1/0025* (2021.05); *H02M 3/07* (2013.01)

(58) Field of Classification Search
CPC ....... H02M 1/0025; H02M 3/07; H02M 3/158
See application file for complete search history.

(56) References Cited

U.S. PATENT DOCUMENTS 9,300,210 B1 *  3/2016  Lidsky ................ H02M 7/4837
10,693,368 B2 *  6/2020  Yu ........................... H02M 3/07
(Continued)

OTHER PUBLICATIONS

Cao, Dong et al., "Zero Voltage Switching Double-Wing Multilevel Modular Switched-Capacitor DC-DC Converter with Voltage Regulation", IEEE Twenty-Eighth Annual IEEE Applied Power Electronics Conference and Exposition (APEC), Mar. 17-21, 2013, 9 pages.

(Continued)

*Primary Examiner* — Jue Zhang
*Assistant Examiner* — Lakaisha Jackson
(74) *Attorney, Agent, or Firm* — Slater Matsil, LLP

(57) ABSTRACT

A control module, for a resonant switched-capacitor converter having first, second, third and fourth cascaded switches and generating an output voltage, includes a timing circuit generating a clock, a controller generating first and second control signals indicating, respectively, first and second control quantities, the difference between which being a function of the difference between a reference quantity and a feedback quantity depending on the output voltage, first and second delay circuits that generate first and second logic signals and, respectively, third and fourth logic signals, the first and third logic signals being delayed with respect to the clock as a function of, respectively, the first and second control quantities, the second and fourth control signals being respectively the logic negation of the first and third logic signals, and a driver that controls the first, second, third, and fourth switches based on, respectively, the first, second, third, and fourth logic signals.

20 Claims, 6 Drawing Sheets

(56) References Cited

U.S. PATENT DOCUMENTS

| | | | |
|---|---|---|---|
| 2019/0341849 A1* | 11/2019 | Lidsky | H02M 3/156 |
| 2020/0321860 A1* | 10/2020 | Amin | H02M 3/158 |
| 2022/0029534 A1* | 1/2022 | Chen | H02M 3/158 |
| 2022/0094318 A1 | 3/2022 | Dal Bianco et al. | |
| 2022/0393594 A1* | 12/2022 | Han | H02M 3/157 |

OTHER PUBLICATIONS

Kim, Seong Joong et al., "High Frequency Buck Converter Design Using Time-Based Control Techniques", IEEE Journal of Solid-State Circuits, vol. 50, No. 4, Apr. 2015, 13 pages.

Li, Yanchao et al., "Multilevel Modular Switched-Capacitor Resonant Converter with Voltage Regulation", Fargo, USA, IEEE Applied Power Electronics Conference and Exposition (APEC), Mar. 26-30, 2017, 7 pages.

Ripamonti, Giacomo et al., "An Integrated Regulated Resonant Switched-Capacitor DC-DC Converter for PoL Applications", IDPIA—University of Udine, Italy, Mar. 17-21, 2019, 6 pages.

Sano, Kenichiro et al., "Improving Dynamic Performance and Efficiency of a Resonant Switched-Capacitor Converter Based on Phase-Shift Control", Tokyo, IEEE Energy Conversion Congress and Exposition, Sep. 20-24, 2009, 8 pages.

Sano, Kenichiro et al., "Performance of a High-Efficiency Switched-Capacitor-Based Resonant Converter With Phase-Shift Control", IEEE Transactions on Power Electronics, vol. 26, No. 2, Feb. 2011, 12 pages.

* cited by examiner

CONTROL MODULE FOR A RESONANT SWITCHED-CAPACITOR CONVERTER AND METHOD FOR CONTROLLING A RESONANT SWITCHED-CAPACITOR CONVERTER

CROSS-REFERENCE TO RELATED APPLICATIONS

This application claims the benefit of Italian Patent Application No. 102022000007265, filed on Apr. 12, 2022, which application is hereby incorporated herein by reference.

TECHNICAL FIELD

The present invention relates to a control module for a resonant switched-capacitor converter and a method for controlling a resonant switched-capacitor converter.

BACKGROUND

As it is known, the so-called switched-capacitor converters (SCC) allow to regulate a direct-current (DC) output voltage \Tout, starting from a DC input voltage $V_{in}$, by transferring energy (charge) between capacitors. Furthermore, among the switched-capacitor converters, there are known the so-called resonant switched-capacitor converters (reSCC), which provide for the presence of an inductor, which forms, along with a capacitor, a resonant circuit, thereby allowing to overcome some of the drawbacks of the purely capacitive switched-capacitor converters, such as the need for the input voltage $V_{in}$ to be greater than a threshold (as an example, in the so-called 2:1 topology, the requirement $V_{in} > 2*V_{out}$ must be met). In addition, the presence of a resonant circuit allows to transfer the charge in an efficient way, because it allows to implement a zero-voltage switching of the transistors, i.e. it allows to reduce the VDS voltage of the transistors during the switching. In addition, since the resonant circuit is driven at a frequency close to the resonance frequency, the inductor can have a very low inductance.

As an example, FIG. 1A shows a converter 1, which is a resonant switched-capacitor DC-DC converter.

The converter 1 includes a first, a second, a third and a fourth transistor $S_1, S_2, S_3, S_4$, which are NMOS transistors.

The first, the second, the third and the fourth transistor $S_1$-$S_4$ are connected in cascade. In particular, the drain terminal of the first transistor $S_1$ forms an input node NIN, which is configured to be set at the input voltage $V_{in}$ (referred to ground) whereas the source terminal of the first transistor $S_1$ forms a first intermediate node $N_1$ and is connected to the drain terminal of the second transistor $S_2$. The input voltage $V_{in}$ is generated by an input source 2.

The source terminal of the second transistor $S_2$ forms an output node $N_{OUT}$ and is connected to the drain terminal of the third transistor $S_3$.

The source terminal of the third transistor $S_3$ forms a second intermediate node $N_2$ and is connected to the drain terminal of the fourth transistor $S_4$, whose source terminal is connected to ground.

The converter 1 further includes a resonant circuit comprising an inductor $L_r$ and a capacitor $C_r$, which are connected in series between the first and the second intermediate node $N_1, N_2$.

The converter 1 further includes an output capacitor $C_o$, which is connected between the output node $N_{OUT}$ and ground. In use, a load 3 is connected between the output node $N_{OUT}$ and ground, in parallel to the output capacitor $C_o$. The voltage on the output node $N_{OUT}$ represents the output voltage $V_{out}$.

In order to control the converter 1, a control module (not shown) generates corresponding digital signals $sS_1, sS_2, sS_3, sS_4$. Though not shown, the gate terminals of the first, the second, the third and the fourth transistor $S_1$-$S_4$ are controlled by corresponding signals which respectively depend on the signals $sS_1$-$sS_4$. In particular, by referring as an example to the first transistor $S_1$, when the signal $sS_1$ is respectively equal to '1' or '0', the corresponding signal present on the gate terminal of the first transistor $S_1$ is respectively equal to a voltage $V_{on1}$ or a voltage $V_{off1}$, which are such that the first transistor $S_1$ is respectively on or off; the same applies to the signals $sS_2, sS_3, sS_4$ and, respectively, the second, the third and the fourth transistor $S_2, S_3, S_4$. Therefore, by adopting an integer index 'i' (with i=1, 2, 3, 4), when the signal $sS_1$ is respectively equal to '1' or '0', the gate terminal of the i-th transistor $S_i$ is set to a voltage which is respectively equal to $V_{on\_i}$ or $V_{off\_i}$, the values $V_{on\_i}$ or $V_{off\_i}$ being such that the i-th transistor $S_i$ is respectively on (i.e., the voltage gate-source is greater than the threshold) or off (i.e., the voltage gate-source is lower than the threshold). In addition, considered any of the signals $sS_1$-$sS_4$, the durations of the time periods in which the signal is equal to '1' or '0' are respectively designated by $T_{ON}$ and $T_{OFF}$; the sum of $T_{ON}$ and $T_{OFF}$ is known as switching period $T_{SW}$.

This having been said, the signal $sS_2$ is equal to the logic negation of the signal $sS_1$; the signal $sS_4$ is equal to the logic negation of the signal $sS_3$. Therefore, the signals $sS_1$ and $sS_2$ form a first pair of signals sharing the same timing, whereas signals $sS_3$ and $sS_4$ form a second pair of signals sharing a same timing; the second pair of signals is time shifted with respect to the first pair of signals.

Based on the values assumed by the signals $sS_1$-$sS_4$, four phases are possible, as shown in FIG. 2, which shows time plots of the signals $sS_1$-$sS_4$ and of the quantities $i_r, i_{out}, v_{Cr}$, which respectively represent the current flowing in the inductor $L_r$, the current coming out from the output node $N_{OUT}$ and the voltage on the capacitor $C_r$.

In particular, when the signals $sS_1$ and $sS_3$ are equal to '1', and thus signals $sS_2$ and $sS_4$ are equal to '0', the converter 1 operates in a first phase, shown in FIG. 1A (in which the transistors that are on and the path followed by the current are depicted in bold line). In the first phase, the first and the third transistor $S_1, S_3$ are on, whereas the second and the fourth transistor $S_2, S_4$ are off. Therefore, during the first phase the current $i_r$ flows through the first and the third transistor $S_1, S_3$ and is delivered to the output capacitor $C_o$ and the load 3.

When the signals $sS_1$ and $sS_3$ are respectively equal to '0' and '1', and thus the signals $sS_2$ and $sS_4$ are respectively equal to '1' and '0', the converter 1 operates in a second phase, shown in FIG. 1B. In the second phase, the first and the fourth transistor $S_1, S_4$ are off, whereas the second and the third transistor $S_2, S_3$ are on, thereby forming a first closed loop including the second and the third transistor $S_2, S_3$, the inductor $L_r$ and the capacitor $C_r$. Therefore, during the second phase the current $i_r$ recirculates in first closed loop, without being delivered to the output capacitor $C_o$ and the load 3.

When the signals $sS_1$ and $sS_3$ are equal to '0', and thus the signals $sS_2$ and $sS_4$ are equal to '1', the converter 1 operates in a third phase, shown in FIG. 1C. In the third phase, the first and the third transistor $S_1, S_3$ are off, whereas the second and the fourth transistor $S_2, S_4$ are on. Therefore, during the third phase, the current $i_r$ flows through the second and the fourth transistor $S_2$, $S_4$ and is delivered to the output capacitor $C_o$ and the load 3.

When the signals $sS_1$ and $sS_3$ are respectively equal to '1' and '0', and thus the signals $sS_2$ and $sS_4$ are respectively equal to '0' and '1', the converter 1 operates in a fourth phase, shown in FIG. 1D. In the fourth phase, the first and the fourth transistor $S_1$, $S_4$ are on, whereas the second and the third transistor $S_2$, $S_3$ are off, thereby forming a second closed loop including the input source 2, the first and the fourth transistor $S_1$, $S_4$, the inductor $L_r$ and the capacitor $C_r$. Therefore, during the fourth phase the current $i_r$ recirculates in second closed loop, without being delivered to the output capacitor $C_o$ and the load 3.

As shown in FIG. 2, the above mentioned second pair of signals (i.e., the signals $sS_3$ and $sS_4$) is delayed by a delay $T_S$ with respect to the first pair of signals (i.e., the signals $sS_1$ and $sS_2$). From another point of view, $T_S$ represents the delay of the signal $sS_3$ with respect to the signal $sS_1$, which is the same as the delay of the signal $sS_4$ with respect to the signal $sS_2$.

This having been said, it is possible to demonstrate that, to a first approximation, the following equation holds true:

$$I_{out}=V_{in}*\tan[\omega_r*T_{SW}]/4]/(Z_r*T_{SW})*T_S \quad (1)$$

wherein $Z_r=(L_r/C_r)^{1/2}$ and $\omega_r=1/(L_r*C_r)^{1/2}$; furthermore, $I_{out}$ represents the average current (meant as average over a switching period $T_{SW}$) flowing through the output node $N_{OUT}$.

From the above equation, it is apparent that, to a first approximation, the current $I_{out}$ linearly depends on the delay $T_S$, therefore the control module can implement a current-mode control loop of the converter 1 as in the case of the purely inductive DC-DC converters, e.g. a control loop in which the delay $T_S$, and thus the current $I_{out}$, depends on the difference between the output voltage $V_{out}$ and a reference voltage, this difference being also known as error. Therefore, the delay $T_S$ may be used as a control signal of the loop. Furthermore, assuming $T_S>0$, the converter 1 operates according to a sequence of phases formed by the iteration of the succession of the first, the second, the third and the fourth phase, as shown in FIG. 2.

In practice, it is possible to implement a control method based on phase-shift modulation, so as to adjust the average output current according to the request of the load 3, such a control method providing for adjusting the relative delay between two pairs of control signals.

In greater detail, the delay $T_S$ assumes positive values when, as shown in FIG. 2, the signal $sS_3$ is delayed with respect to the signal $sS_1$, i.e. when the above mentioned second pair of signals is delayed with respect the first pair of signals. On the contrary, the delay $T_S$ assumes negative values when the signal $sS_1$ is delayed with respect to the signal $sS_3$, i.e. when the above mentioned second pair of signals is early with respect the first pair of signals. Furthermore, the above equation (1) holds true irrespective of the sign of the delay $T_S$; that means that, if $T_S>0$, the current $I_{out}$ comes out from the output node $N_{OUT}$, towards the output capacitor $C_o$ and the load 3, whereas, if $T_S<0$, the current $I_{out}$ is drained from the output capacitor $C_o$ and the load 3 and enters the output node $N_{OUT}$. In addition, when $T_S>0$, the converter 1 operates in buck-mode, whereas, when $T_S<0$, the converter 1 operates in boost-mode.

In known resonant switched-capacitor converters, the loop controlling the delay $T_S$ is such that delay $T_S$ has a fixed predetermined sign, based on whether the converter 1 has to be operated in the buck-mode 0 boost-mode. Put in other words, the control loop is such that the delay $T_S$ has a fixed corresponding sign, and therefore the current $I_{out}$ has a fixed direction. In order to enter the opposite operation mode, the control loops have to be modified so as to change the generation of the control signal (i.e., the delay $T_S$), therefore a discontinuity in the control loop has to be introduced. Put in other words, the relationship between the control signal and the error has to be changed, when the converter 1 switches between the buck-mode and the boost-mode.

If the above mentioned discontinuity is not implemented, the current $I_{out}$ has a fixed direction, therefore the converter 1 may not be able to handle some operating circumstances. As example, if $T_S>0$, the control loop is not able to react to an overvoltage on the load 3, i.e. the converter 1 cannot sink current. To this regard, an overvoltage may occur, as an example, during the start-up, in case a boost of current occurs before the voltage on the output capacitor $C_o$ reaches the steady-state value; as an alternative, an overvoltage may occur also at steady-state, in case of a rapid decrease of the current absorbed by the load 3; as a further example, an overvoltage may occur in case the load 3 happens to inject current in the output node $N_{OUT}$.

The aim of the present invention is thus to provide a module for controlling a resonant switched-capacitor converter that will enable the drawbacks of the prior art to be overcome at least in part.

SUMMARY

According to the present invention, a control module and a method for controlling a resonant switched-capacitor converter are provided, as defined in the annexed claims.

BRIEF DESCRIPTION OF THE DRAWINGS

For a better understanding of the present invention, preferred embodiments thereof will now be described purely by way of non-limiting example, with reference to the attached drawings, wherein.

DETAILED DESCRIPTION OF ILLUSTRATIVE EMBODIMENTS

Figure 3:
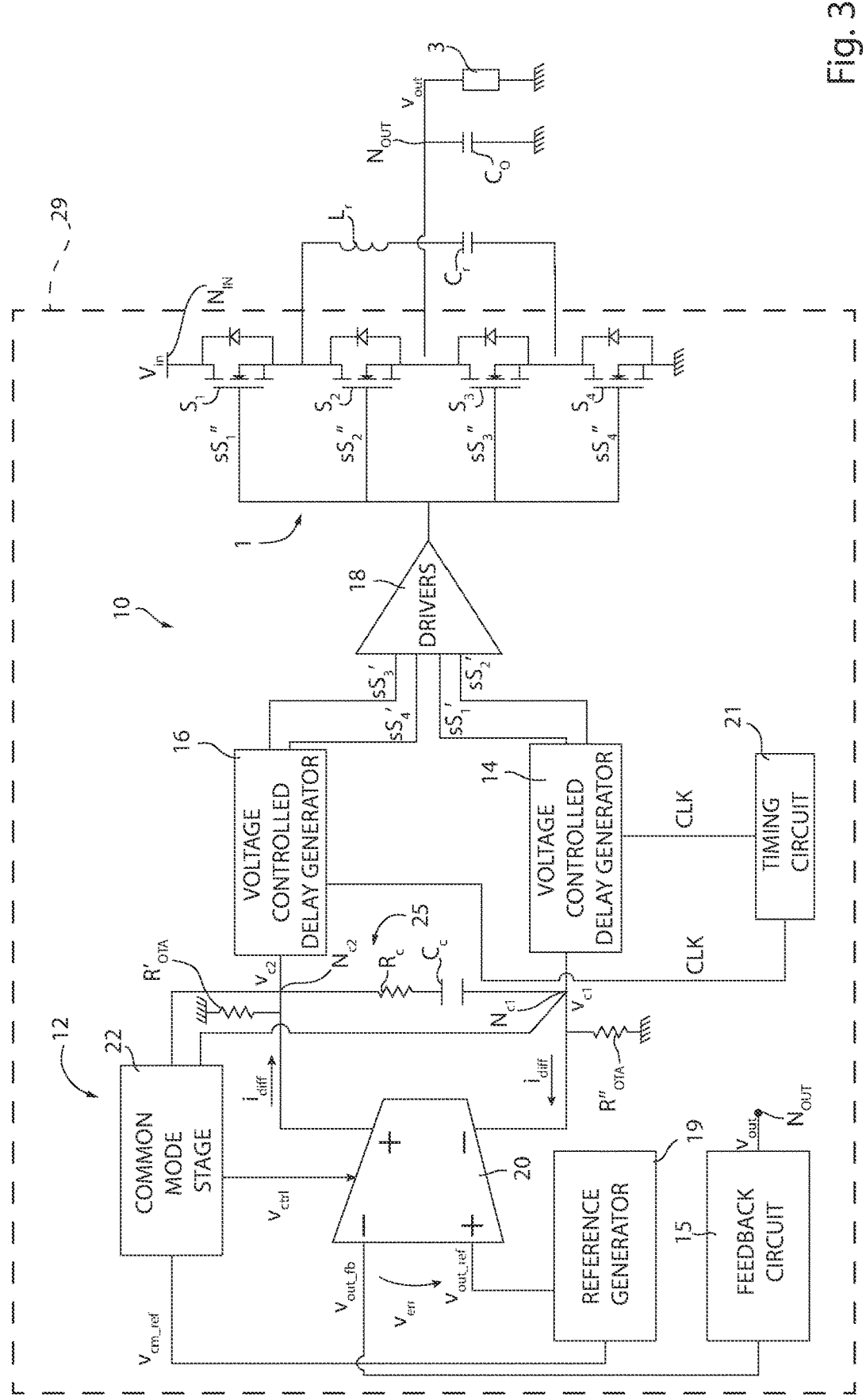
FIG. 3 shows a circuit scheme of a control module.

FIG. 3 shows a control module 10, which controls the converter 1 shown in FIGS. 1A-1D.

In detail, the control module 10 comprises an operational transconductance amplifier 12, a first and a second voltage controlled delay generator 14, 16, a driver stage 18, a resistor $R_c$ and a capacitor $C_c$. The capacitance of the capacitor $C_r$ may be comprised as an example in the range 10 pF-10 pF; the inductance of the inductor $L_r$ may be comprised in the range 1 nH-10 pH.

In addition, the control module 10 comprises a feedback circuit 15, a reference generator 19 and a timing circuit 21.

The feedback circuit 15 is connected to the output node $N_{OUT}$ and is configured to generate a feedback voltage $v_{out\_fb}$, starting from the output voltage on the output node $N_{OUT}$, here designated by $v_{out}$. As an example, the feedback circuit 15 may include a voltage divider such that the feedback voltage $v_{out\_fb}$ is equal to a fraction of the output voltage $v_{out}$; however, embodiments are possible in which, as an example, $v_{out\_fb} = v_{out}$.

The reference generator 19 is configured to generate an output reference voltage $v_{out\_ref}$ and a common mode reference voltage $v_{cm\_ref}$, which may be equal, e.g., to half the supply voltage of the operational transconductance amplifier 12. To this end, though not shown, the reference generator 19 may include one or mode bandgap circuits.

The timing circuit 21 is configured to generate a clock signal CLK having a period $T_{CLK}$ and duty cycle as an example equal to 50%.

The operational transconductance amplifier 12 comprises a transconductance amplifier stage 20 and a common mode stage 22.

The transconductance amplifier stage 20 has a positive input terminal, which is connected to the reference generator 19 to receive the output reference voltage $v_{out\_ref}$ and a negative input terminal, which is connected to the feedback circuit 15 to receive the feedback voltage $v_{out\_fb}$. Therefore, an error voltage $v_{err} = v_{out\_ref} - v_{out\_fb}$ is present on the input of the transconductance amplifier stage 20.

Furthermore, the transconductance amplifier stage 20 has a negative output terminal and a positive input terminal, which respectively form a first and a second control node $N_{c1}$, $N_{c2}$. The resistor $R_c$ and the capacitor $C_c$ are connected in series between the first and the second control node $N_{c1}$, $N_{c2}$, so as to form a compensation network 25. In addition, FIG. 3 also shows the output equivalent resistance of the transconductance amplifier stage 20, which is represented by a first resistor $R'_{OTA}$, which is connected between the negative output terminal of the transconductance amplifier 20 and ground, and a second resistor $R''_{OTA}$, which is connected between the positive output terminal of the transconductance amplifier 20 and ground, the first and the second resistor $R'_{OTA}$, $R''_{OTA}$ having the same resistance $R_{out}$.

The inputs of the first and the second voltage controlled delay generator 14, 16 are respectively connected to the first and the second control node $N_{c1}$, $N_{c2}$; furthermore, each of the first and the second voltage controlled delay generator 14, 16 is connected to the timing circuit 21, to receive the clock signal CLK.

The common mode stage 22 is connected to the reference generator 19 to receive the common mode reference voltage $V_{cm\_ref}$; furthermore, the common mode stage 22 is connected to the first and the second control node $N_{c1}$, $N_{c2}$, to receive the corresponding voltages, hereinafter respectively referred to as the first and the second control voltage $v_{c1}$, $v_{c2}$. In addition, the common mode stage 22 generates an inner control voltage $v_{ctrl}$ based on the first and the second control voltage $v_{c1}$, $v_{c2}$ and on the common mode reference voltage $V_{cm\_ref}$; the transconductance amplifier stage 20 is controlled by the inner control voltage $v_{ctrl}$, as explained in greater detail here below.

The transconductance amplifier stage 20 is a differential amplifier configured to generate a current $i_{diff} = G_{diff} * v_{err}$, with $G_{diff}$ representing a differential gain constant.

Assuming a very high value of the resistance $R_{out}$, when $i_{diff} > 0$, the current $i_{diff}$ flows, starting from the positive output terminal of the transconductance amplifier stage 20, into the second control node $N_{c2}$ and then into the resistor $R_c$ and the capacitor $C_c$; finally, the current $i_{diff}$ enters the negative output terminal of the transconductance amplifier stage 20. Therefore, the first and the second control voltage $v_{c1}$, $v_{c2}$ depends on the current $i_{diff}$. If $i_{diff} < 0$, the current $i_{diff}$ flows, starting from the negative output terminal of the transconductance amplifier stage 20, into the first control node $N_{c1}$ and then into the capacitor $C_c$ and the resistor $R_c$; finally, the current $i_{diff}$ enters the positive output terminal of the transconductance amplifier stage 20.

The common mode stage 22 senses the first and the second control voltage $v_{c1}$, $v_{c2}$, computes the average $v_{cm} = (v_{c1} + v_{c2})/2$ and compares the average $v_{cm}$ with the common mode reference voltage $v_{cm\_ref}$. Furthermore, the common mode stage 22 generates the inner control voltage $v_{ctrl}$, which controls the biasing of the transconductance amplifier stage 20, so that the dc-value of each of the first and the second control voltage $v_{c1}$, $v_{c2}$ is substantially equal to the common mode reference voltage $v_{cm\_ref}$. As an example, the inner control voltage $v_{ctrl}$ may by approximately equal to $v_{ctrlDC} + A_{cm} * (v_{cm} - v_{cm\_ref})$, wherein $v_{ctrlDC}$ and $A_{cm}$ are constant.

Furthermore, the inner control voltage $v_{ctrl}$ may modify the output bias current $i_{cm}$ (not shown in FIG. 3) of the transconductance amplifier stage 20, i.e. the common mode output current which is injected into either the first and the second control node $N_{c1}$, $N_{c2}$. As an example, the following equations may apply:

$$i_{cm} = -g_{cm} * A_{cm} * (v_{cm} - v_{cm\_ref}) \quad (2)$$

$$dv_{c1} = dv_{c2} = -g_{cm} * A_{cm} * (v_{cm} - v_{cm\_ref}) * R_{out} \quad (3)$$

wherein $g_{cm}$ is a common mode gain constant, whereas $dv_{c1}$ and $dv_{c2}$ represent the voltage variations induced by the output bias current $ic_m$ respectively on the first and the second control node $N_{c1}$, $N_{c2}$.

In practice, the common mode stage 22 forms a negative feedback with a gain equal to $-g_{cm} * A_{cm} * R_{out}$; such a gain is high, so the above mentioned approximation $v_{cm} = v_{cm\_ref}$ holds true. In other words, the common mode stage 22 forms a closed control loop configured to set the average $v_{cm}$ equal to the common mode reference voltage $v_{cm\_ref}$. This closed control loop allows to keep the first and the second control voltage $v_{c1}$, $v_{c2}$ within a predetermined operating range and prevent them from, e.g., saturating.

In greater detail, under the assumption that Routtends to infinite, the first and the second control voltage $v_{c1}$, $v_{c2}$ are approximately equal to:

$$v_{c1} = v_{cm\_ref} - G_{diff} * v_{err} * Z_{diff}/2 \quad (4)$$

$$V_{c2} = v_{cm\_ref} + G_{diff} * v_{err} * Z_{diff}/2 \quad (5)$$

wherein $Z_{diff}$ represents the sum of the impedances of the resistor $R_c$ and the capacitor $C_c$, i.e. $Z_{diff} = R_c + 1/(sC_c)$, with 's' equal to the complex pulsation.

As a consequence, in the Laplace domain the following equation applies:

$$V_{c2}(s) - V_{c1}(s) = G_{diff} * V_{err}(S) * Z_{diff} \quad (6)$$

In the time domain, the equation (6) corresponds to:

$$v_{c2}(t) - v_{c1}(t) = G_{diff} * R_c * v_{err}(t) + G_{diff}/C_c * \text{integral}_{t=0}{}^t [v_{err}(t')dt'] \quad (7)$$

wherein the dependence from time 't' of the quantities $v_{c1}$, $v_{c2}$ and $v_{err}$ has been made explicit.

The first voltage controlled delay generator 14 generates a first pair of control signals, namely a first and a second control signal $sS_1'$, $sS_2'$, as a function of the clock signal CLK and the first control voltage $v_{c1}$.

Figure 4:
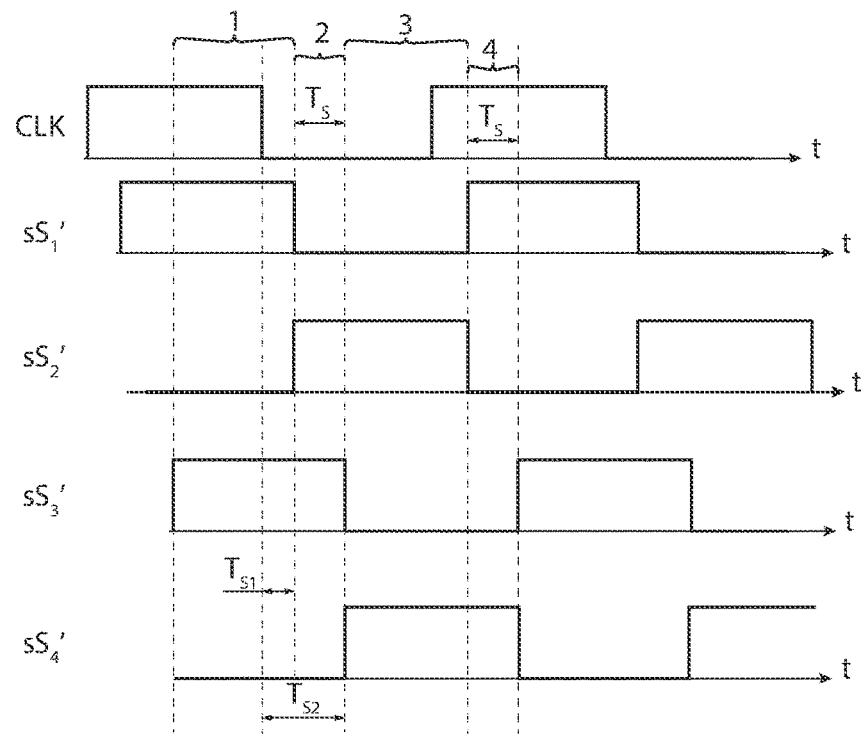
FIG. 4 shows time plots of quantities generated in the control module shown in FIG. 3.

The first and the second control signal $sS_1'$, $sS_2'$ are digital signals with period equal to the period $T_{CLK}$ and duty cycle equal to 50%; the second control signal $sS_2'$ is the logic negation of the first control signal $sS_1'$. Furthermore, as shown in FIG. 4, the first control signal $sS_1'$ is delayed by a first delay $T_{S1}$ with respect to the clock signal CLK.

The first delay $T_{S1}$ may be directly proportional to the first control voltage $v_{c1}$, i.e. $T_{S1}=k*v_{c1}$ (with k constant). Furthermore, by designating with a function $f_{vcdl}$ the relationship between the first delay $T_{S1}$ and the first control voltage $v_{c1}$, i.e. by referring to $T_{S1}=f_{vcdl}(v_{c1})$, in case the practical implementation of the first voltage controlled delay generator 14 is such that the function $f_{vcdl}$ is not linear, it is possible to linearize the function $f_{vcdl}$ around the point $v_{c1}=v_{cm\_ref}$, in which case the first delay $T_{S1}$ is approximately equal to $f_{vcdl}(v_{cm\_ref})+df_{vcdl}/dv_{c1}*(v_{c1}-v_{cm\_ref})$.

The second voltage controlled delay generator 16 generates a second pair of control signals, namely a third and a fourth control signals $sS_3'$, $sS_4'$, as a function of the clock signal CLK and the second control voltage $v_{c2}$.

The third and the fourth control signals $sS_3'$, $sS_4'$ are digital signals with period equal to the period $T_{CLK}$ and duty cycle equal to 50%; the fourth control signal $sS_4'$ is the logic negation of the third control signal $sS_3'$. Furthermore, as shown in FIG. 4, the third control signal $sS_3'$ is delayed by a second delay $T_{S2}$ with respect to the clock signal CLK.

The second delay $T_{S2}$ may be directly proportional to the second control voltage $v_{c2}$, i.e. $T_{S2}=k*v_{c2}$. Furthermore, assuming that the second voltage controlled delay generator 16 is such that $T_{S2}=f_{vcdl}(v_{c2})$, even if the function $f_{vcdl}$ is not linear, it is possible to linearize the function $f_{vcdl}$ around the point $v_{c2}=v_{cm\_ref}$, in which case the second delay $T_{S2}$ is approximately equal to $f_{vcdl}(v_{cm\_ref})+df_{vcdl}/dv_{c2}*(v_{c2}-v_{cm\_ref})$. Therefore, the following equation applies:

$$T_S=T_{S2}-T_{S1}=k_{vcdl}*(v_{c2}-v_{c1}) \qquad (8)$$

with $k_{vcdl}=df_{vcdl}/dv_{c1}=df_{vcdl}/dv_{c2}$.

In detail, the second voltage controlled delay generator 16 may be equal to the first voltage controlled delay generator 14.

The technical implementation of the first and the second voltage controlled delay generator 14, 16 is irrelevant for the implementation of the invention. By referring, as an example, to the first voltage controlled delay generator 14 only, in a per se known manner it may be implemented so as to charge, at each rising edge of the clock signal CLK, a respective capacitor (not shown) with a fixed current, and to generate a rising edge of the first control signal $sS_1'$ when the voltage on the capacitor reaches a threshold value depending on the first control voltage $v_{c1}$, the corresponding falling edge of the first control signal $sS_1'$ being generated in the same manner, namely by charging, at each falling edge of the clock signal CLK, the capacitor with a fixed current, and generating the falling edge of the first control signal $sS_1'$ when the voltage on the capacitor reaches the threshold value. As an alternative, not shown, the first voltage controlled delay generator 14 may implement an inverter chain, whose supply voltage is equal to the first control voltage $v_{c1}$, so that the delay introduced by the inverter chain depends on the first control voltage $v_{c1}$.

In practice, the third control signal $sS_3'$ is delayed by the delay $T_S$ with respect to the first control signal $sS_1'$; furthermore, the fourth control signal $sS_4'$ is delayed by the delay $T_S$ with respect to the second control signal $sS_2'$. Therefore, the second pair of control signals is delayed by the delay $T_S$ with respect to the first pair of control signals. Furthermore, as apparent from equation (8), the delay $T_S$ does not depend on the above mentioned average $v_{cm}$. Therefore, as apparent from equation (7), the delay $T_S$ has a dependence on the current $i_{diff}$ (and thus also on the error voltage $v_{err}$) which is, to a first approximation, of the proportional and integrative type. From a physical standpoint, this dependence is explained here below with reference, as an example, to the case $i_{diff}>0$.

In detail, at low frequencies, i.e. in case of slowly varying components of the error voltage $v_{err}$, the capacitor $C_c$ dominates the behaviour of the series circuit formed by the resistor $R_c$ and the capacitor $C_c$; therefore, the current $i_{diff}$ is integrated by the capacitor $C_c$, thereby causing the second control voltage $v_{c2}$ to rise and the first control voltage $v_{c1}$ to decrease. At high frequencies, i.e. in case of quickly varying components of the error voltage $v_{err}$, the capacitor $C_c$ acts as a short circuit, so the current $i_{diff}$ causes a voltage drop between the second control node $N_{c2}$ and the first control node $N_{c1}$, which depends on the resistance of the resistor $R_c$.

The driver stage 18 is connected to the first and the second voltage controlled delay generator 14, 16 and to the first, the second, the third and the fourth transistor S1, S2, S3, S4.

In detail, the driver stage 18 receives the first, the second, the third and the fourth control signal $sS_1'$, $sS_2'$, $sS_3'$, $sS_4'$ and generates a corresponding first gate signal $sS_1''$, a corresponding second gate signal $sS_2''$, a corresponding third gate signal $sS_3''$ and a corresponding fourth gate signal $sS_4''$, which are respectively applied to the gate terminals of the first, the second, the third and the fourth transistor $S_1$, $S_2$, $S_3$, $S_4$.

Figure 1A:
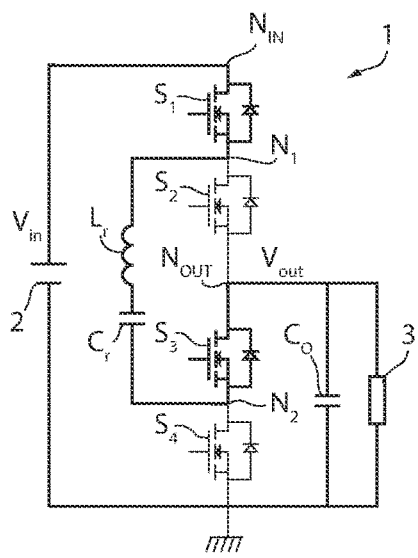
FIGS. 1A-1D show circuit schemes of a portion of a converter, in different operating phases.
Figure 1B:
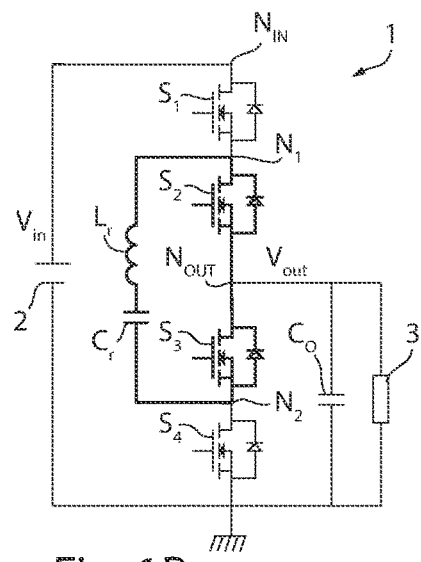
Figure 1C:
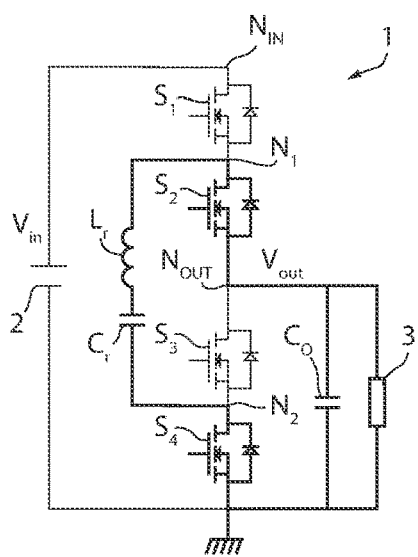
Figure 1D:
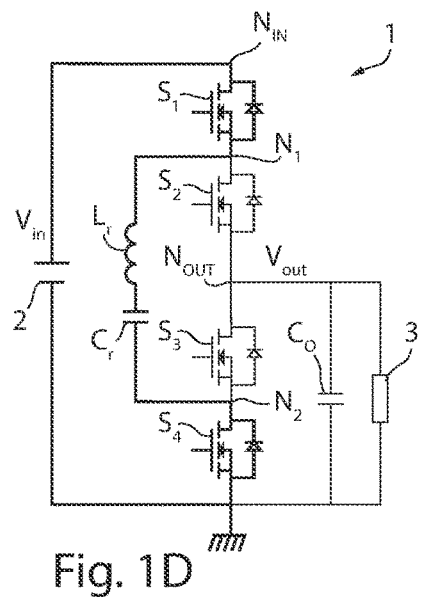
Figure 2:
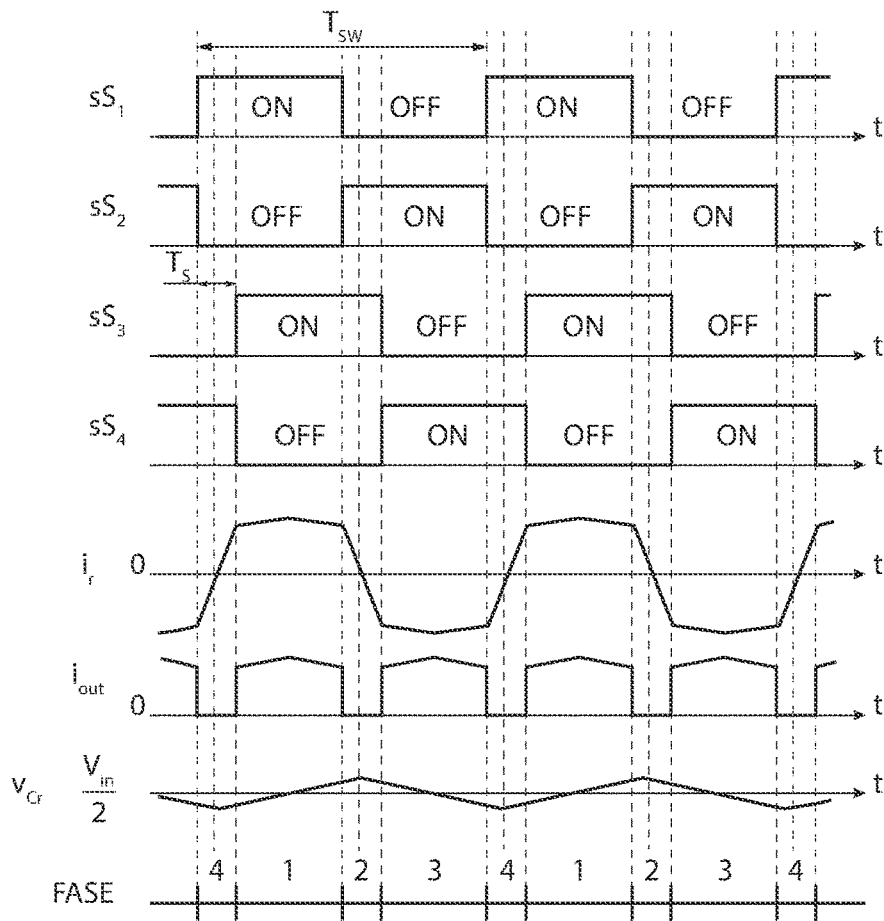
FIG. 2 shows time plots of quantities generated in the converter shown in FIGS. 1A-1D.

In greater detail, by adopting an integer index 'i' (with i=1, 2, 3, 4), when the control signal $sS_i'$ is respectively equal to '1' or '0', the corresponding gate signal $sS_i''$ is respectively equal to a voltage $V_{on\_i}$ or a voltage $V_{off\_i}$, the voltages $V_{on\_i}$ and $V_{off\_i}$ being such that the i-th transistor $S_i$ is respectively on or off. Therefore, as shown in FIG. 4, the same four operating phases discussed with reference to FIG. 2 are possible, i.e.:

i) the first phase, in which $sS_1'=sS_3'='1'$ and $sS_2'=sS_4'='0'$, so that the first and the third transistor $S_1$, $S_3$ are on, whereas the second and the fourth transistor $S_2$, $S_4$ are off;

ii) the second phase, in which $sS_1'=sS_4'='0'$ and $sS_2'=sS_3'='1'$, so that the first and the fourth transistor $S_1$, $S_4$ are off, whereas the second and the third transistor $S_2$, $S_3$ are on;

iii) the third phase, in which $sS_1'=sS_3'='0'$ and $sS_2'=sS_4'='1'$, so that the first and the third transistor $S_1$, $S_3$ are off, whereas the second and the fourth transistor $S_2$, $S_4$ are on; and iv) the fourth phase, in which $sS_1'=sS_4'='1'$ and $sS_2'=sS_3'='0'$, so that the first and the fourth transistor $S_1$, $S_4$ are on, whereas the second and the third transistor $S_2$, $S_3$ are off.

In particular, as shown in FIG. 4, if $T_S>0$ (i.e., if $v_{err}>0$) the converter 1 is operated in the same manner as described with reference to FIG. 2, i.e. the converter 1 operates according to a sequence of phases formed by the iteration of the succession of the first, the second, the third and fourth phase.

In case $T_S$ becomes negative (i.e., if the error voltage $v_{err}$ becomes negative), as an example because of an overvoltage occurring on the load 3, the converter 1 continues to work. There is no need to implement any change of the control module 10, i.e. any discontinuity of the control. In this case, the direction of the current $i_{diff}$ is inverted with respect to the case shown in FIG. 4, and the above mentioned first pair of signals (i.e., the signals $sS_1'$ and $sS_2'$) is delayed with respect to the second pair of signals (i.e., the signals $sS_3'$ and $sS_4'$). The converter 1 operates according to a sequence of phases formed by the iteration of the succession of the fourth, the third, the second, and first phase.

Since it is possible to demonstrate that equation (1) holds true, the control module 10 is able to handle either positive and negative values of the delay $T_S$, with one and the same circuit topology, namely with the same control circuit formed by the feedback circuit 15, the operational transconductance amplifier 12, the first and the second voltage controlled delay generator 14, 16, the resistor $R_c$ and the capacitor $C_c$, as well as with the same output reference voltage $v_{out\_ref}$ and the same common mode reference voltage $v_{cm\_ref}$.

Figure 5:
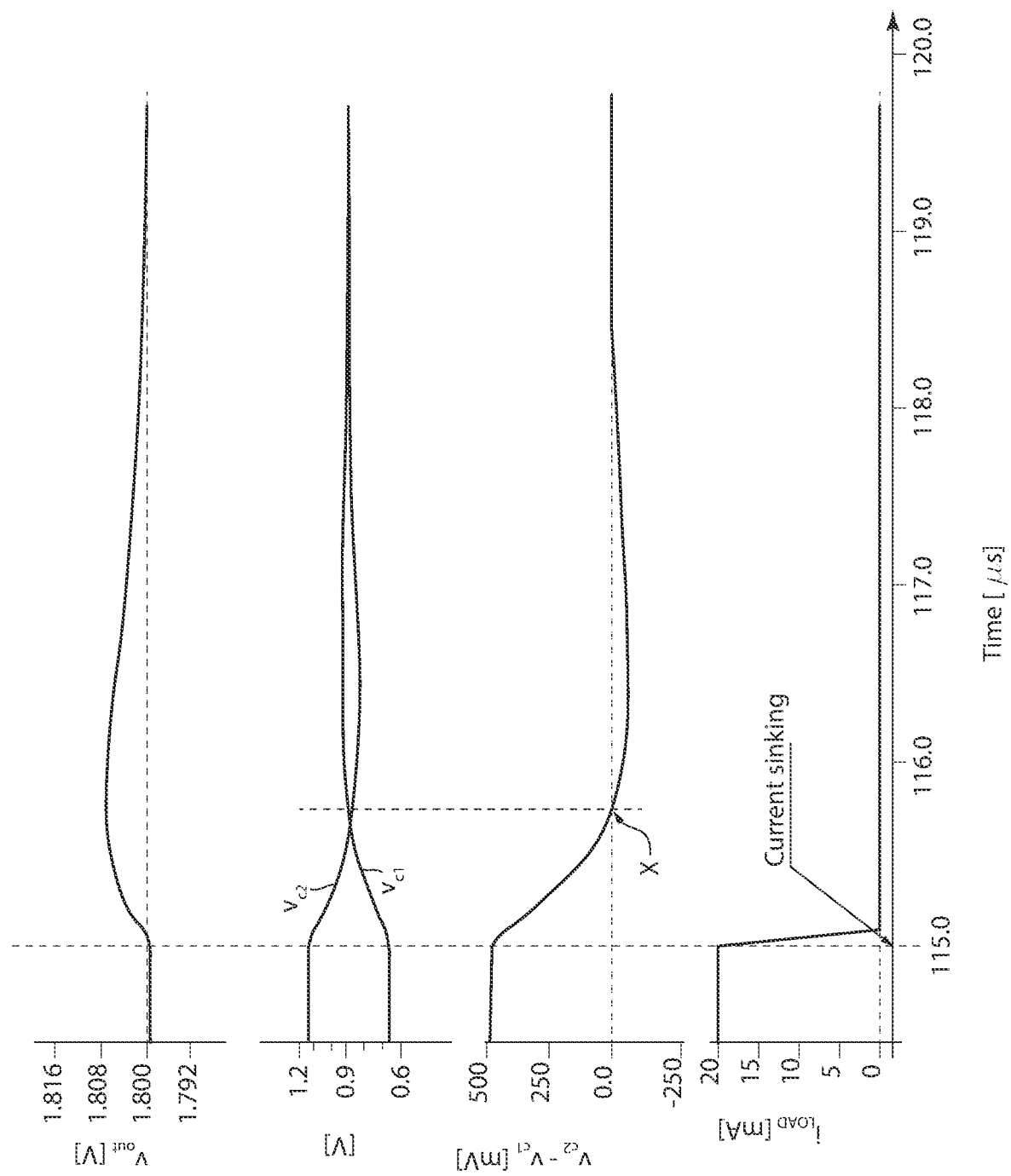
FIG. 5 shows time plots of quantities generated in the control module shown in FIG. 3 and in a converter coupled to the control module.

As an example, FIG. 5 shows a scenario in which an overvoltage and a consequent current sinking occur. In particular, FIG. 5 shows the time plot of the current in the load 3, here designated by $i_{LOAD}$, of the quantity $v_{c2}-v_{c1}$, of the first and the second control voltage $v_{c1}$, $v_{c2}$ and the output voltage $v_{out}$. It may be appreciated that, at t=115 μs, the current $i_{LOAD}$ falls to zero, so the output voltage $v_{out}$ tends to rise above its steady-state value (1.8V). The first and the second control voltage $v_{c1}$, $v_{c2}$ respectively tend to rise and fall with respect to the corresponding steady-state values (0.65V and 1.15V), so that, at a time instant marked with X, the quantity $v_{c2}-v_{c1}$ (and thus also the delay $T_S$) becomes negative. Then, the first and the second control voltage $v_{c1}$, $v_{c2}$ tend to reach the same new steady-state value, equal to 0.9V, and the output voltage $v_{out}$ assumes again its steady-state value (1.8V). Therefore, the control module 10 has correctly handled the phenomenon of the current sinking, without any need to implement changes of the control loop.

From a practical point of view, as shown in FIG. 3, the control module 10 may be integrated within a single semiconductor die 29 along with the first, the second, the third and the fourth transistor $S_1$, $S_2$, $S_3$, $S_4$. The inductor $L_r$, the capacitor $C_r$ and the output capacitor $C_o$ may be arranged outside the die 29, though embodiments are possible (not shown) in which also the inductor $L_r$ and the capacitor $C_r$ are integrated in the die 29. Similarly, embodiments are possible in which the first, the second, the third and the fourth transistor $S_1$, $S_2$, $S_3$, $S_4$ are arranged outside the die 29.

Figure 6:
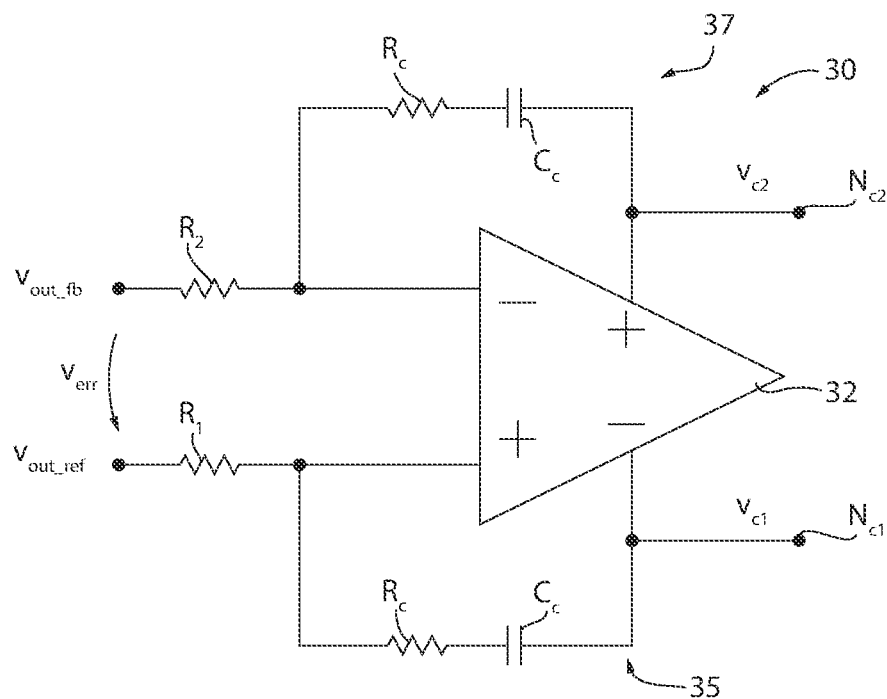
FIGS. 6 and 7 respectively show circuit schemes of portions of variants of the control module.

According to a different embodiment, shown in FIG. 6, a fully differential voltage amplifier 30 is used to replace the operational transconductance amplifier 12. The embodiment of FIG. 6 is described here below with reference to the differences over the embodiment of FIG. 3.

In detail, the fully differential voltage amplifier 30 includes an operational amplifier 32 with differential output, whose negative output terminal and positive output terminal are respectively connected to the first and the second control node $N_{c1}$, $N_{c2}$, i.e. to the inputs of the first and, respectively, the second voltage controlled delay generator 14, 16 (not shown in FIG. 6).

The fully differential voltage amplifier 30 further includes a first and a second input resistor $R_1$, $R_2$, which have a same resistance and whose first terminals are respectively connected to the positive input terminal and the negative input terminal of the operational amplifier 32; the second terminals of the first and the second input resistor $R_1$, $R_2$ are respectively connected to the reference generator 19 and to the feedback circuit 15, in order to respectively receive the output reference voltage $v_{out\_ref}$ and the feedback voltage $v_{out\_fb}$.

The fully differential voltage amplifier 30 further includes the compensation network (here designated by 35) formed by the series circuit including the resistor $R_c$ and the capacitor $C_c$, this series circuit being connected between the positive input terminal and the negative output terminal of the operational amplifier 32. In addition, the fully differential voltage amplifier 30 includes an additional compensation network 37, which is equal to the compensation network 35 and is connected between the negative input terminal and the positive output terminal of the operational amplifier 32.

Although not shown, the fully differential voltage amplifier 30 further includes a common mode stage (not shown) coupled to the first and the second control voltage $v_{c1}$, $v_{c2}$ and to the operational amplifier 32 so as to form a control loop that controls the biasing voltages of the first and the second control voltage $v_{c1}$, $v_{c2}$ so that their average is substantially equal to the common mode reference voltage $v_{cm\_ref}$.

In practice, also in the embodiment of FIG. 6, the delay $T_S$ linearly depends, to a first approximation, on the quantity $v_{c2}-v_{c1}$, this latter being equal, to a first approximation, to the above equation (8).

Therefore, the functioning of the embodiment of FIG. 6 is the same as the one of FIG. 3.

Figure 7:
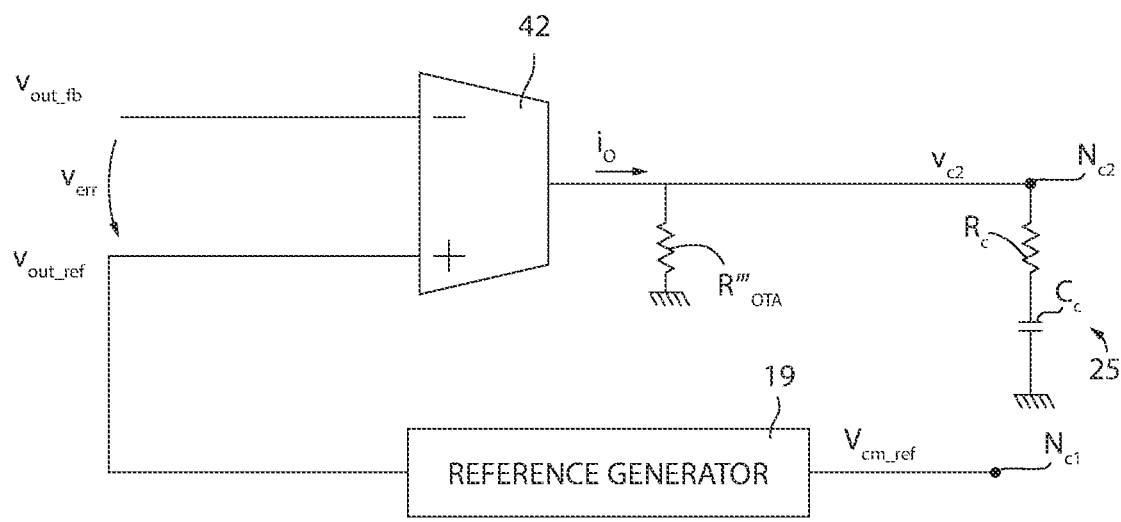

According to a further embodiment, shown in FIG. 7, a single-ended transconductance amplifier 42 is used.

The negative input terminal and the positive input terminal of the single-ended transconductance amplifier 42 are respectively connected to the feedback circuit 15 (not shown in FIG. 7) and to the reference generator 19, in order to respectively receive the feedback voltage $v_{out\_fb}$ and the output reference voltage $v_{out\_ref}$. The output terminal of the single-ended transconductance amplifier 42 is connected to the second control node $N_{c2}$, whereas the first control node $N_{c1}$ may be connected to the reference generator 19, so as to be set to a voltage equal (as an example) to the common mode reference voltage $v_{cm\_ref}$. FIG. 7 also shows the output equivalent resistance of the single-ended transconductance amplifier 42, which is designated by $R'''_{OTA}$. The common mode stage 22 is absent.

In greater detail, the compensation network 25 is connected between the second control node $N_{c2}$ and ground, i.e. it is decoupled from the first control node $N_{c1}$. Though not shown in FIG. 7, the inputs of the first and the second voltage controlled delay generator 14, 16 are still respectively connected to the first and the second control node $N_{c1}$, $N_{c2}$.

In this embodiment, the operating point of the second control node $N_{c2}$ is set by the loop which controls the output voltage $v_{out}$. As an example, if $i_{LOAD}$ is equal to zero, the loop imposes $v_{c2}=v_{c1}$. If $i_{LOAD}$ is different from zero, and under the assumption that the single-ended transconductance amplifier 42 generates a current $i_o=g_m*v_{err}$ (with $g_m$ constant) and assuming an infinite value of the output equivalent resistance $R'''_{OTA}$, the same approximations of the above equations (6) and (7) hold true, if the quantity $G_{diff}$ is replaced by the quantity $g_m$. Therefore, the function of the control module 10 stays the same.

Figure 8:
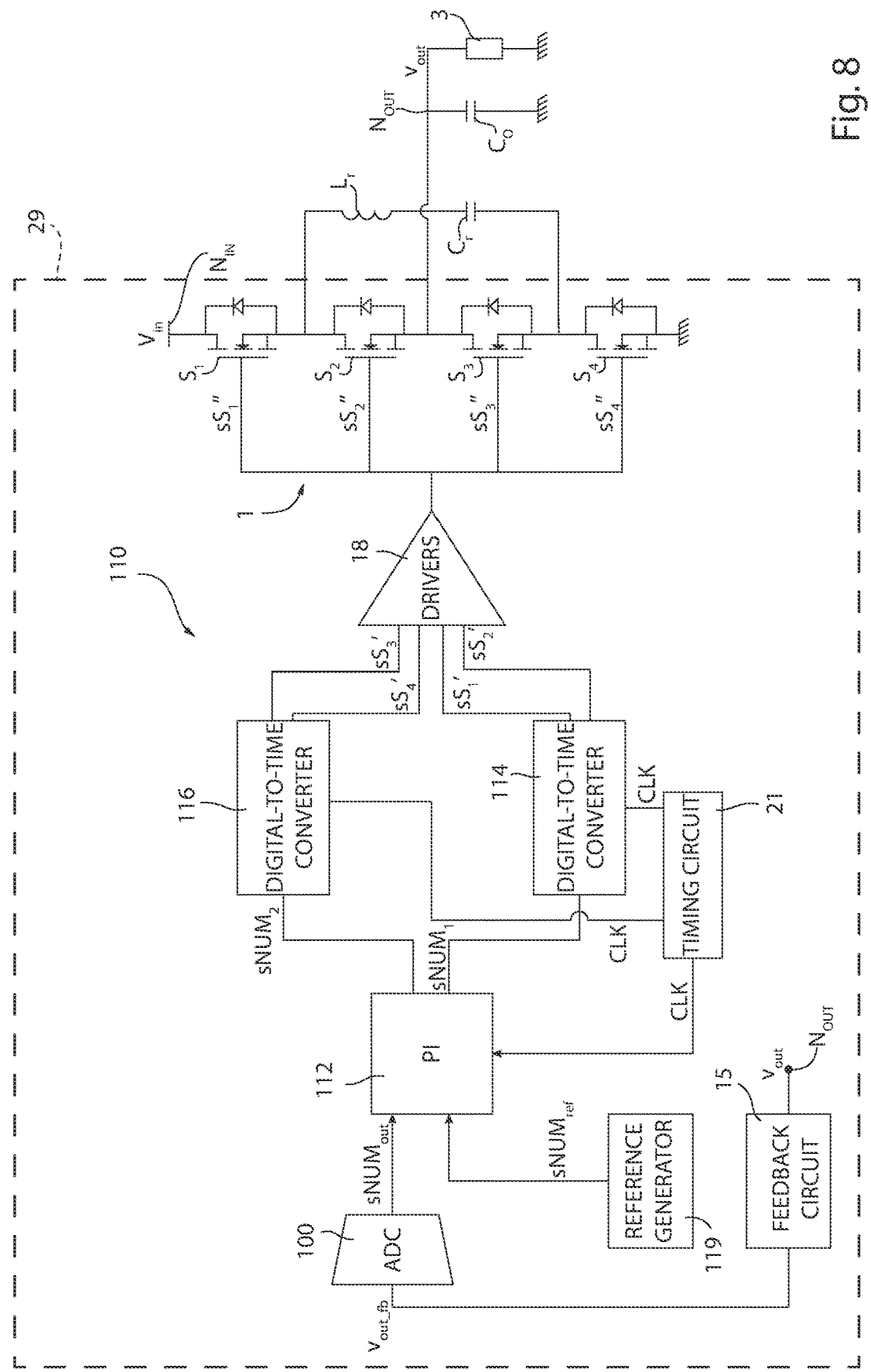
FIG. 8 shows a circuit scheme of a variant of the control module.

According to a different embodiment shown in FIG. 8, the control module (here designated by 11o) includes an analog-to-digital converter (ADC) 100, a proportional integrative controller 112 and a first and a second digital-to-time converter 114, 116.

The input of the analog-to-digital converter 100 is connected to the feedback circuit 15, to receive the feedback voltage $v_{out\_fb}$. The analog-to-digital converter 100 converts the feedback voltage $v_{out\_fb}$ into a digital signal $sNUM_{out}$, which is provided on the output of the analog-to-digital converter 100 and represents a corresponding numerical value $NUM_{out}$.

The reference generator, here designated by 119, generates a respective digital signal $sNUM_{ref}$ which is provided on the output of the reference generator 119 and represents a corresponding numerical value $NUM_{ref}$. The numerical value $NUM_{ref}$ may be equal, as an example, to the numerical value that would be generated by the analog-to-digital converter 100 if this latter received at input the output reference voltage $v_{out\_ref}$.

The inputs of the proportional integrative controller 112 are connected to the outputs of the analog-to-digital converter 100, of the reference generator 119 and of the timing circuit 21, to receive the signals $sNUM_{out}$, $sNUM_{ref}$ and the clock signal CLK.

The proportional integrative controller 112 has a first and a second output, which are respectively connected to inputs of the first and the second digital-to-time converter 114, 116, these latter being further connected to the timing circuit 21, to receive the clock signal CLK.

The proportional integrative controller 112 generates a first and a second control signal $sNUM_1$, $sNUM_2$ of the digital type, respectively on the first and the second output. The first and the second control signal $sNUM_1$, $sNUM_2$ respectively represent corresponding numerical values $NUM_1$, $NUM_2$.

In particular, by referring to $NUM_{err}$ to designate $NUM_{ref} - NUM_{out}$ and by adopting the symbol 'j' to index the samples of $NUM_{err}$ and of the first and the second control signal $sNUM_1$, $sNUM_2$ (i.e., the corresponding numerical values $NUM_1$, $NUM_2$), the following equations apply:

$$NUM_1(j) = NUM_{os} + K_{prop} * NUM_{err}(j) + K_{int} * sum_{u=o;j} [NUM_{err}(u)];$$

$$NUM_2(j) = NUM_{os} - K_{prop} * NUM_{err}(j) - K_{int} * sum_{u=o;j} [NUM_{err}(u)]; \quad (9)$$

wherein: "sum" represents the sum of the corresponding addends, which are indexed by the index u=0, 1, . . . , j; $NUM_{os}$ represents an arbitrary numerical offset, which is applied to guarantee that $NUM_1$ and $NUM_2$ are positive; $K_{prop}$ and $K_{int}$ are positive constants; $NUM_{err}(j) = NUM_{ref} - NUM_{out}(j)$.

As an example, the sampling period of the signal $sNUM_{out}$ and of the first and the second control signal $sNUM_1$, $sNUM_2$ may be equal to the period of the clock signal CLK. However, it is also possible for the first and the second control signal $sNUM_1$, $sNUM_2$, as well as for the signal $sNUM_{out}$, to be sampled at a frequency lower than the frequency of the clock signal CLK.

The first digital-to-time converter 114 is configured to generate the abovementioned first and second control signals $sS_1'$, $sS_2'$ in a manner such that the first delay $T_{S1}$ of the first control signal $sS_1'$ with respect to the clock signal CLK is equal to $k_{DTC} * NUM_1$, wherein $k_{DTC}$ is a constant which is a function of the period of the clock signal CLK. As an example, $k_{DTC}$ may be equal to 1/(MULT*Tclock), with Tclock representing the period of the clock signal CLK and MULT representing a positive integer number; furthermore, as an example, if NBIT is the number of bits used to represent $NUM_1$, $MULT > 2^{NBIT}$. The second control signal $sS_2'$ is still the logic negation of the first control signal $sS_1'$.

The second digital-to-time converter 116 is configured to generate the above mentioned third and fourth control signals $sS_3'$, $sS_4'$ in a manner such that the second delay $T_{S2}$ of the third control signal $sS_3'$ with respect to the clock signal CLK is equal to $k_{DTC} * NUM_2$. The fourth control signal $sS_4'$ is still the logic negation of the third control signal $sS_3'$.

Basically, each of the first and the second digital-to-time converter 114, 116 converts a corresponding number into a delay. To this end, each of the first and the second digital-to-time converter 114, 116 may be formed by a respective counter which is updated with a high-frequency clock (i.e., with a clock having a frequency higher than the frequency of the clock signal CLK), the counter being compared with a corresponding threshold which depends, respectively, on $NUM_1$ or $NUM_2$. As an example, referring to the first digital-to-time converter 114, the counter may be reset at each edge of the clock signal CLK, and a corresponding edge of the first control signal $sS_1'$ is generated when the counter reaches a threshold that is equal to $NUM_1$. As an alternative, each of the first and the second digital-to-time converter 114, 116 may be formed by a programmable delay line, i.e. a chain of delay elements and a multiplexer, which selects the output of chain based on $NUM_1$ or, respectively, $NUM_2$. In any case, the technical implementation of the first and the second digital-to-time converter 114, 116 is irrelevant to the implementation of the invention.

Irrespective of the technical implementation of the first and the second digital-to-time converter 114, 116, the j-th sample of the delay $T_S$ of the second pair of control signals with respect to the first pair of control signals is equal to $k_{DTC} * (NUM_2 - NUM_1) = 2 * k_{DTC} * \{K_{prop} * NUM_{err}(j) + K_{int} * sum_{u=o;j}[NUM_{err}(u)]\}$. Therefore, also in this embodiment the delay $T_S$ has a dependence on the error between the output voltage $v_{out}$ and the reference (this latter being represented by $NUM_{ref}$), such a dependence being of the proportional and integrative type.

In practice, the control module 110 shown in FIG. 8 has the same behaviour as the control module 10 shown in FIG. 3 and it affords the same advantages, in particular in terms of capability of handling either positive and negative values of the delay $T_S$, without the need to introduce control discontinuities.

As shown in FIG. 8, the control module 11o may still be integrated in the die 29, along with the first, the second, the third and the fourth transistor $S_1$, $S_2$, $S_3$, $S_4$. The inductor $L_r$, the capacitor $C_r$ and the output capacitor $C_o$ may be arranged outside the die 29, though embodiments are possible (not shown) in which also the inductor $L_r$ and the capacitor $C_r$ are integrated in the die 29. Similarly, embodiments are possible in which the first, the second, the third and the fourth transistor $S_1$, $S_2$, $S_3$, $S_4$ are arranged outside the die 29.

The advantages that the present solution affords emerge clearly from the foregoing description. In particular, the control module allows to continuously change the output current and to avoid any discontinuity in the control in case of transition from $T_S > 0$ to $T_S < 0$ (or vice-versa), as an example following the occurrence of an overvoltage. Therefore, thanks to the smooth source-to-sink transition, the control loop can easily counteract against any possible overvoltage that may occur during the regulation (e.g., during the start-up or during current load transients).

In addition, all the embodiments but the one of FIG. 7 benefit from the advantages of the differential topology, i.e. a high power supply rejection ratio (PSRR) as well as a high gain and a high voltage swing. The embodiment of FIG. 7 benefits from a simpler circuit implementation.

Finally, it is clear that, as mentioned previously, modifications and variations may be made to what has been described and illustrated herein, without departing from the scope of the present invention, as defined in the annexed claims.

For instance, the switches of the converter may be formed by transistors of a different type with respect to the type of the transistors mentioned before. In addition, the first, the second, the third and the fourth transistor $S_1$, $S_2$, $S_3$, $S_4$ may be formed by different types of transistors; as an example, embodiments are possible in which the first and the third transistor $S_1$, $S_3$ are P-MOS transistors, whereas the second and the fourth transistor $S_2$, $S_4$ are N-MOS transistors.

The first and the second voltage controlled delay generator 14, 16 may be replaced by stages configured to convert the first and the second control voltage $v_{c1}$, $v_{c2}$ into a first and a second control current $i_{c1}$, $i_{c2}$, respectively followed by corresponding per se known current controlled delay generators.

The compensation network may include further electrical components, such as an additional capacitor connected in parallel to the series circuit formed by the resistor $R_c$ and the capacitor $C_c$, in order to reduce the loop gain at high frequencies and improve stability.

In addition, the compensation network may be such that the relationship between the difference $v_{c2}$-$v_{c1}$ and the error voltage $v_{err}$ is not of the proportional and integrative type, though this type of relationship affords some additional advantages, such as a high loop gain at low frequencies and a fast response at medium frequencies (owing to the proportional part of the relationship), thereby providing a good response during fast transients, as well as a high loop gain at DC and low frequencies (owing to the integrative part of the relationship), thereby reducing the residual error at steady-state, so as to obtain a better load regulation. As an example, the compensation network may be formed only by the resistor $R_c$ or only by the capacitor $C_c$, if lower performances are acceptable.

From a more general standpoint, by referring to the first and the second control quantity to designate either i) the first and the second control voltage $v_{c1}$, $v_{c2}$ or ii) the numerical values $NUM_1$ and $NUM_2$, and referring to the error quantity to designate either i) the error voltage $v_{err}$ or ii) $NUM_{err}$, the difference between the second control quantity and the first control quantity may have a dependence on the error quantity different from the abovementioned proportional integrative relationship. As an example, referring to the embodiment of FIG. 8, equations (9) may be modified so as to implement a saturation of $NUM_1(j)$ and $NUM_2(j)$ and/or limit the number of previous samples which are considered to compute the third addends of the equations (9).

Similarly, by referring to the first delay $T_{S1}$ (but the same considerations apply also to the second delay $T_{S2}$), its dependence on the first control voltage $v_{c1}$ or on the numerical value $NUM_1$ may be not linear, but generically monotonic; in case of a decreasing monotonic dependence, the loop control of the output voltage $v_{out}$ may be adapted to introduce a sign inversion (e.g., in the generation of the feedback voltage $v_{out\_fb}$ or inside the operational transconductance amplifier 12), to maintain a global negative feedback of the loop controlling the output voltage $v_{out}$.

Similarly, the dependence of the delay $T_S$ on the difference $v_{c2}$-$v_{c1}$ or on the difference $NUM_2$-$NUM_1$ may be not linear, but generically monotonic. Also, in this case, if the dependence is of the decreasing monotonic type, the loop control of the output voltage $v_{out}$ may be adapted as explained before, to maintain a global negative feedback of the loop controlling the output voltage $v_{out}$. As an example, when the first and the second voltage controlled delay generator 14, 16 are formed by corresponding inverter chains, the delay generated by each of them decreases as the voltage at input rises, so, in order to have a global negative feedback, it is possible, as an example, to connect the inputs of the first and the second voltage controlled delay generator 14, 16 to the second control node $N_{c2}$ and, respectively, to the first control node $N_{c1}$.

What is claimed is:

1. A control module for a resonant switched-capacitor converter comprising a first, a second, a third and a fourth switch connected in cascade, a resonant series circuit coupled to the first, the second, the third and the fourth switch, and an output node configured to be coupled to a load, the resonant switched-capacitor converter configured to apply an output voltage on the output node, the control module comprising:
   a timing circuit configured to generate a clock signal;
   a feedback circuit configured to generate a feedback quantity that depends on the output voltage;
   a reference circuit configured to generate a reference signal indicating a reference quantity;
   a controller stage configured to generate a first and a second control signal indicating, respectively, a first and a second control quantity, a difference between the second control quantity and the first control quantity being a function of an error quantity equal to a difference between the reference quantity and the feedback quantity;
   a first delay circuit configured to receive the first control signal and generate a first and a second logic signal, the second control signal being a logic negation of the first logic signal, the first logic signal being delayed by a first time quantity with respect to the clock signal, the first time quantity being a function of the first control quantity;
   a second delay circuit configured to receive the second control signal and generate a third and a fourth logic signal, the fourth logic signal being a logic negation of the third logic signal, the third logic signal being delayed by a second time quantity with respect to the clock signal, the second time quantity being a function of the second control quantity; and
   a driver circuit configured to generate a first, a second, a third and a fourth driving signal, respectively based on the first, the second, the third and the fourth logic signal, the first, second, third and fourth driving signals being respectively configured to control the first, the second, the third and the fourth switch such that, in response to each of the first, second, third and fourth logic signals being in a first or a second logic state, the corresponding controlled switch is respectively on or off.

2. The control module according to claim 1, wherein the first and the second time quantity monotonically depend, respectively, on the first control quantity and the second control quantity; and wherein a difference between the second time quantity and the first time quantity monotonically depends on the difference between the second control quantity and the first control quantity.

3. The control module according to claim 1, wherein the difference between the second control quantity and the first control quantity depends on the error quantity in a proportional and/or integrative way.

4. The control module according to claim 1, wherein the feedback quantity is a feedback voltage; wherein the reference quantity is a reference voltage; and wherein the controller stage comprises:

a first and a second control node;
a first compensation network coupled to the first and the second control node and including a compensation resistor and/or a compensation capacitor connected in series; and
an operational transconductance amplifier coupled to the first and the second control node and configured to generate a differential current proportional to the error quantity, the differential current flowing at least in part through the first compensation network;
wherein the first and the second control quantity are respectively equal to voltages on the first and the second control node.

5. The control module according to claim 4, wherein the first compensation network comprises the respective compensation resistor and the respective compensation capacitor, connected in series.

6. The control module according to claim 1, wherein the feedback quantity is a feedback voltage; wherein the reference quantity is a reference voltage; and wherein the controller stage comprises a first and a second control node and a fully differential voltage amplifier, which includes:
an amplifier with a differential output, which has a first and a second input terminal and a first and a second output terminal;
a first and a second compensation network equal to one another, the first compensation network comprising a respective compensation resistor and/or a respective compensation capacitor, the first compensation network being coupled to the first input terminal and the first output terminal of the amplifier with the differential output, the second compensation network being coupled to the second input terminal and the second output terminal of the amplifier with the differential output; and
a first and a second input resistor, which have first terminals that are respectively coupled to the first and the second input terminal of the amplifier with the differential output, second terminals of the first and the second input resistor being configured to be respectively set to the reference voltage and the feedback voltage.

7. The control module according to claim 1, wherein the feedback quantity is a feedback voltage; wherein the reference quantity is a reference voltage; and
wherein the controller stage comprises:
a first and a second control node;
a first compensation network coupled to the second control node and to a reference potential and including a compensation resistor and/or a compensation capacitor; and
a single-ended transconductance amplifier having an output terminal coupled to the second control node and configured to inject a current proportional to the error quantity into the second control node;
wherein the first and the second control quantity are respectively equal to an additional reference voltage and to a voltage on the second control node.

8. The control module according to claim 1, wherein the feedback quantity is a feedback voltage; wherein the reference quantity is a reference number; and wherein the controller stage comprises:
an analog-to-digital converter configured to generate a digital signal representing an output numerical value, as a function of the feedback voltage; and
a controller configured to receive the digital signal and the reference signal and to generate the first and the second control signal so that the first and the second control quantity are respectively formed by a first and a second numerical value, each of the first and the second numerical value being a function of the error quantity.

9. The control module according to claim 8, wherein the first and the second delay circuit are digital-to-time converters; and wherein the first and the second time quantity are respectively proportional to, respectively, the first and the second numerical value.

10. A system comprising:
a resonant switched-capacitor converter comprising:
a first, a second, a third and a fourth switch connected in cascade;
a resonant series circuit coupled to the first, the second, the third and the fourth switch; and
an output node configured to be coupled to a load, the resonant switched-capacitor converter configured to apply an output voltage on the output node; and
a control module comprising:
a timing circuit configured to generate a clock signal;
a feedback circuit configured to generate a feedback quantity that depends on the output voltage;
a reference circuit configured to generate a reference signal indicating a reference quantity;
a controller stage configured to generate a first and a second control signal indicating, respectively, a first and a second control quantity, a difference between the second control quantity and the first control quantity being a function of an error quantity equal to a difference between the reference quantity and the feedback quantity;
a first delay circuit configured to receive the first control signal and generate a first and a second logic signal, the second control signal being a logic negation of the first logic signal, the first logic signal being delayed by a first time quantity with respect to the clock signal, the first time quantity being a function of the first control quantity;
a second delay circuit configured to receive the second control signal and generate a third and a fourth logic signal, the fourth logic signal being a logic negation of the third logic signal, the third logic signal being delayed by a second time quantity with respect to the clock signal, the second time quantity being a function of the second control quantity; and
a driver circuit configured to generate a first, a second, a third and a fourth driving signal, respectively based on the first, the second, the third and the fourth logic signal, the first, second, third and fourth driving signals being respectively configured to control the first, the second, the third and the fourth switch such that, in response to each of the first, second, third and fourth logic signals being in a first or a second logic state, the corresponding controlled switch is respectively on or off.

11. The system according to claim 10, wherein the first and the second time quantity monotonically depend, respectively, on the first control quantity and the second control quantity; and wherein a difference between the second time quantity and the first time quantity monotonically depends on the difference between the second control quantity and the first control quantity.

12. The system according to claim 10, wherein the difference between the second control quantity and the first control quantity depends on the error quantity in a proportional and/or integrative way.

13. The system according to claim 10, wherein the feedback quantity is a feedback voltage; wherein the reference quantity is a reference voltage; and wherein the controller stage comprises:
- a first and a second control node;
- a first compensation network coupled to the first and the second control node and including a compensation resistor and/or a compensation capacitor connected in series; and
- an operational transconductance amplifier coupled to the first and the second control node and configured to generate a differential current proportional to the error quantity, the differential current flowing at least in part through the first compensation network;
- wherein the first and the second control quantity are respectively equal to voltages on the first and the second control node.

14. The system according to claim 10, wherein the feedback quantity is a feedback voltage; wherein the reference quantity is a reference voltage; and wherein the controller stage comprises:
- a first and a second control node;
- a first compensation network coupled to the second control node and to a reference potential and including a compensation resistor and/or a compensation capacitor; and
- a single-ended transconductance amplifier having an output terminal coupled to the second control node and configured to inject a current proportional to the error quantity into the second control node;
- wherein the first and the second control quantity are respectively equal to an additional reference voltage and to a voltage on the second control node.

15. The system according to claim 10, wherein the feedback quantity is a feedback voltage; wherein the reference quantity is a reference voltage; and wherein the controller stage comprises a first and a second control node and a fully differential voltage amplifier, which includes:
- an amplifier with a differential output, which has a first and a second input terminal and a first and a second output terminal;
- a first and a second compensation network equal to one another, the first compensation network comprising a respective compensation resistor and/or a respective compensation capacitor, the first compensation network being coupled to the first input terminal and the first output terminal of the amplifier with the differential output, the second compensation network being coupled to the second input terminal and the second output terminal of the amplifier with the differential output; and
- a first and a second input resistor, which have first terminals that are respectively coupled to the first and the second input terminal of the amplifier with the differential output, second terminals of the first and the second input resistor being configured to be respectively set to the reference voltage and the feedback voltage.

16. The system according to claim 10, wherein the feedback quantity is a feedback voltage; wherein the reference quantity is a reference number; and wherein the controller stage comprises:
- an analog-to-digital converter configured to generate a digital signal representing an output numerical value, as a function of the feedback voltage; and
- a controller configured to receive the digital signal and the reference signal and to generate the first and the second control signal so that the first and the second control quantity are respectively formed by a first and a second numerical value, each of the first and the second numerical value being a function of the error quantity.

17. A method for controlling a resonant switched-capacitor converter comprising a first, a second, a third and a fourth switch connected in cascade, a resonant series circuit coupled to the first, the second, the third and the fourth switch, and an output node configured to be coupled to a load, the resonant switched-capacitor converter configured to apply an output voltage on the output node, the method comprising:
- generating a clock signal;
- generating a feedback quantity that depends on the output voltage;
- generating a reference signal indicating a reference quantity;
- generating a first and a second control signal indicating, respectively, a first and a second control quantity, a difference between the second control quantity and the first control quantity being a function of an error quantity equal to a difference between the reference quantity and the feedback quantity;
- based on the first control signal, generating a first and a second logic signal, the second logic signal being a logic negation of the first logic signal, the first logic signal being delayed by a first time quantity with respect to the clock signal, the first time quantity being a function of the first control quantity;
- based on the second control signal, generating a third and a fourth logic signal, the fourth logic signal being a logic negation of the third logic signal, the third logic signal being delayed by a second time quantity with respect to the clock signal, the second time quantity being a function of the second control quantity; and
- generating a first, a second, a third and a fourth driving signal, respectively based on the first, the second, the third and the fourth logic signal, the first, second, third and fourth driving signals being respectively configured to control the first, the second, the third and the fourth switch in a manner such that, in response to each of the first, second, third and fourth logic signals being in a first or a second logic state, the corresponding controlled switch is respectively on or off.

18. The method according to claim 17, wherein the first and the second time quantity monotonically depend, respectively, on the first control quantity and the second control quantity; and a difference between the second time quantity and the first time quantity monotonically depends on the difference between the second control quantity and the first control quantity.

19. The method according to claim 17, wherein the difference between the second control quantity and the first control quantity depends on the error quantity in a proportional and/or integrative way.

20. The method according to claim 17, wherein the feedback quantity is a feedback voltage, the reference quantity is a reference number, and the method further comprises:
- generating a digital signal representing an output numerical value, as a function of the feedback voltage;
- receiving the digital signal and the reference signal; and
- generating the first and the second control signal so that the first and the second control quantity are respectively formed by a first and a second numerical value, each of the first and the second numerical value being a function of the error quantity.

* * * * *